US009529908B2

(12) United States Patent
Risvik et al.

(10) Patent No.: US 9,529,908 B2
(45) Date of Patent: Dec. 27, 2016

(54) TIERING OF POSTING LISTS IN SEARCH ENGINE INDEX

(75) Inventors: Knut Magne Risvik, Mo I Rana (NO);
Michael Hopcroft, Kirkland, WA (US);
John G. Bennett, Bellevue, WA (US);
Karthik Kalyanaraman, Bellevue, WA (US); Trishul Chilimbi, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/951,799

(22) Filed: Nov. 22, 2010

(65) Prior Publication Data

US 2012/0130996 A1 May 24, 2012

(51) Int. Cl.
*G06F 7/00* (2006.01)
*G06F 17/30* (2006.01)

(52) U.S. Cl.
CPC ................ *G06F 17/30864* (2013.01)

(58) Field of Classification Search
CPC ................................ G06F 17/30864
See application file for complete search history.

(56) References Cited

U.S. PATENT DOCUMENTS

| 4,769,772 | A | 9/1988 | Dwyer |
| 5,193,180 | A | 3/1993 | Hastings |
| 5,640,487 | A | 6/1997 | Lau et al. |
| 5,983,216 | A | 11/1999 | Kirsch et al. |
| 6,167,397 | A | 12/2000 | Jacobson et al. |
| 6,173,298 | B1 | 1/2001 | Smadja |
| 6,507,829 | B1 | 1/2003 | Richards et al. |
| 6,571,251 | B1 | 5/2003 | Koski et al. |
| 6,704,729 | B1 | 3/2004 | Klein et al. |
| 6,807,545 | B1 | 10/2004 | VanDamme |

(Continued)

FOREIGN PATENT DOCUMENTS

| CN | 1517914 | 8/2004 |
| CN | 1670723 | 9/2005 |

(Continued)

OTHER PUBLICATIONS

International Search Report and Written Opinion in PCT/US2011/059834, mailed May 23, 2012.

(Continued)

*Primary Examiner* — Usmaan Saeed
*Assistant Examiner* — Paul Kim
(74) *Attorney, Agent, or Firm* — Jessica Meyers; Tom Wong; Micky Minhas

(57) ABSTRACT

A search index includes tiered posting lists. Each posting list in the search index corresponds with a different atom and includes a list of documents containing the particular document. Additionally, a rank is stored with each document listed in a posting list for a given atom representing the relevance of the atom to the context of each document. At least some of the posting lists in the search index are tiered. A tiered posting list is divided into a number of tiers with the tiers being ordered by document while each tier is internally ordered by document. Employing tiered posting lists within the search index allows a search engine to evaluate search queries in a manner that allows for a number of efficiencies and precise stopping.

21 Claims, 7 Drawing Sheets

(56) References Cited

U.S. PATENT DOCUMENTS

| | | |
|---|---|---|
| 6,901,411 B2 | 5/2005 | Li et al. |
| 6,999,958 B2 | 2/2006 | Carlson et al. |
| 7,039,631 B1 | 5/2006 | Finger, II |
| 7,072,889 B2 | 7/2006 | Ogawa |
| 7,152,064 B2 | 12/2006 | Bourdoncle et al. |
| 7,305,385 B1 | 12/2007 | Dzikiewicz et al. |
| 7,330,857 B1 | 2/2008 | Svingen et al. |
| 7,421,418 B2 | 9/2008 | Nakano |
| 7,433,893 B2 | 10/2008 | Lowry |
| 7,593,934 B2 | 9/2009 | Li et al. |
| 7,596,745 B2 | 9/2009 | Dignum et al. |
| 7,693,813 B1 | 4/2010 | Cao et al. |
| 7,702,614 B1 | 4/2010 | Shah et al. |
| 7,761,407 B1 | 7/2010 | Stern |
| 7,765,215 B2 | 7/2010 | Hsu et al. |
| 7,783,644 B1 | 8/2010 | Petrou et al. |
| 7,792,846 B1 | 9/2010 | Raffill et al. |
| 7,930,290 B2 | 4/2011 | Farouki |
| 7,966,307 B2 * | 6/2011 | Iwayama et al. ............ 707/706 |
| 7,984,043 B1 | 7/2011 | Waas |
| 8,010,482 B2 | 8/2011 | Andersen et al. |
| 8,166,203 B1 | 4/2012 | Yang |
| 8,255,386 B1 * | 8/2012 | Annau et al. ................ 707/711 |
| 8,527,523 B1 | 9/2013 | Ravid |
| 2002/0032772 A1 | 3/2002 | Olstad |
| 2002/0091671 A1 | 7/2002 | Prokoph |
| 2002/0129015 A1 | 9/2002 | Caudill et al. |
| 2003/0191737 A1 | 10/2003 | Steele et al. |
| 2003/0217052 A1 | 11/2003 | Rubenczyk et al. |
| 2004/0044952 A1 | 3/2004 | Jiang et al. |
| 2004/0098399 A1 | 5/2004 | Risberg et al. |
| 2004/0133557 A1 | 7/2004 | Wen et al. |
| 2004/0139167 A1 | 7/2004 | Edsall et al. |
| 2005/0010560 A1 | 1/2005 | Altevogt et al. |
| 2005/0038866 A1 | 2/2005 | Noguchi et al. |
| 2005/0210383 A1 | 9/2005 | Cucerzan |
| 2005/0222975 A1 | 10/2005 | Nayak et al. |
| 2005/0283526 A1 | 12/2005 | O'Neal et al. |
| 2006/0018551 A1 | 1/2006 | Patterson |
| 2006/0020571 A1 | 1/2006 | Patterson |
| 2006/0080311 A1 | 4/2006 | Potok et al. |
| 2006/0155690 A1 | 7/2006 | Wen et al. |
| 2006/0195440 A1 | 8/2006 | Burges et al. |
| 2006/0248066 A1 | 11/2006 | Brewer |
| 2007/0040813 A1 | 2/2007 | Kushler et al. |
| 2007/0067274 A1 | 3/2007 | Han et al. |
| 2007/0078653 A1 | 4/2007 | Olsen |
| 2007/0150467 A1 | 6/2007 | Beyer et al. |
| 2007/0250501 A1 | 10/2007 | Grubb |
| 2008/0027912 A1 | 1/2008 | Liu et al. |
| 2008/0027920 A1 | 1/2008 | Schipunov et al. |
| 2008/0028010 A1 | 1/2008 | Ramsey |
| 2008/0059187 A1 | 3/2008 | Roitblat et al. |
| 2008/0059489 A1 | 3/2008 | Han et al. |
| 2008/0082520 A1 | 4/2008 | Bohn et al. |
| 2008/0114750 A1 | 5/2008 | Saxena et al. |
| 2008/0208836 A1 | 8/2008 | Zheng et al. |
| 2008/0216715 A1 | 9/2008 | Langford |
| 2008/0294634 A1 | 11/2008 | Fontoura et al. |
| 2009/0012956 A1 | 1/2009 | Wen et al. |
| 2009/0070322 A1 | 3/2009 | Salvetti et al. |
| 2009/0083262 A1 | 3/2009 | Chang et al. |
| 2009/0106232 A1 | 4/2009 | Burges |
| 2009/0112843 A1 * | 4/2009 | Hsu et al. .................... 707/5 |
| 2009/0132515 A1 | 5/2009 | Lu et al. |
| 2009/0132541 A1 | 5/2009 | Barsness et al. |
| 2009/0187550 A1 | 7/2009 | Mowatt et al. |
| 2009/0187555 A1 | 7/2009 | Liu et al. |
| 2009/0216715 A1 | 8/2009 | Dexter |
| 2009/0216740 A1 | 8/2009 | Ramakrishnan et al. |
| 2009/0248669 A1 | 10/2009 | Shetti et al. |
| 2009/0254523 A1 | 10/2009 | Lang et al. |
| 2009/0271385 A1 | 10/2009 | Krishnamoorthy et al. |
| 2009/0327274 A1 | 12/2009 | Kejariwal et al. |
| 2010/0057718 A1 | 3/2010 | Kulkarni |
| 2010/0082617 A1 | 4/2010 | Liu et al. |
| 2010/0114561 A1 | 5/2010 | Yasin |
| 2010/0121838 A1 | 5/2010 | Tankovich et al. |
| 2010/0138426 A1 | 6/2010 | Nakayama et al. |
| 2010/0179933 A1 | 7/2010 | Bai et al. |
| 2010/0198857 A1 | 8/2010 | Metzler et al. |
| 2010/0205172 A1 | 8/2010 | Luk |
| 2010/0318516 A1 | 12/2010 | Kolen et al. |
| 2010/0318519 A1 | 12/2010 | Hadjieleftheriou et al. |
| 2011/0093459 A1 | 4/2011 | Dong et al. |
| 2011/0191310 A1 | 8/2011 | Liao et al. |
| 2011/0289080 A1 | 11/2011 | Murdock |
| 2012/0130925 A1 | 5/2012 | Risvik et al. |

FOREIGN PATENT DOCUMENTS

| | | |
|---|---|---|
| CN | 1728143 | 2/2006 |
| CN | 101246492 A | 8/2008 |
| CN | 101322125 | 12/2008 |
| CN | 101388026 | 3/2009 |
| CN | 101393565 | 3/2009 |
| CN | 101437031 A | 5/2009 |
| CN | 101583945 | 11/2009 |
| CN | 101635741 A | 1/2010 |
| CN | 101950300 A | 1/2011 |
| EP | D952535 A | 10/1999 |

OTHER PUBLICATIONS

Final Office Action in US Appl. No. 13/045,278, mailed Jul. 19, 2012.

Ganti, et al., "Preconnputing Search Features for Fast and Accurate Query Classification," In: Third ACM International Conference on Web Search and Data Mining, Feb. 4-6, 2010, 10 pages, New York City, NY.

Tandon, et al., "Information Extraction from Web-Scale N-Gram Data," In: Special Interest Group on Information Retrieval Web N-Gram Workshop, 2010, 8 pages.

Zobel, et al., "Finding Approximate Matches in Large Lexicons," Software—Practice and Experience, Mar. 1995, by John Wiley & Sons, Ltd., pp. 331-345, vol. 25, Issue 3, Australia.

Pike, et al., "Interpreting the Data: Parallel Analysis with Sawzall," In Scientific Programming—Dynamic Grids and Worldwide Computing, vol. 13, Issue 4, 2005, pp. 1-33.

Shah, et al., "Flux: An Adaptive Partitioning Operator for Continuous Query Systems," 19th International Conference on Data Engineering (ICDE'03), 2003, 16 pp.

Tamura, et al., "Parallel Database Processing on a 100 Node PC Cluster: Cases for Decision Support Query Processing and Data Mining," In Proceedings of the 1997 ACM/IEEE conference on Supercomputing (CDROM), 1997, 16 pp.

Non-Final Office Action mailed Jan. 31, 2012 for U.S. Appl. No. 13/045,278.

Non-final Office Action mailed Apr. 11, 2012 in U.S. Appl. No. 12/951,528.

Non-Final Office Action mailed Apr. 5, 2012, in U.S. Appl. No. 12/951,747.

Non-Final Office Action mailed Apr. 17, 2012, in U.S. Appl. No. 12/951,815.

International Search Report and Written Opinion in PCT/US2011/059650, mailed Apr. 10, 2012.

Non-Final Office Action in U.S. Appl. No. 12/951,747, mailed Nov. 1, 2012.

Final Office Action in U.S. Appl. No. 13/072,419, mailed Aug. 9, 2013, 45 pages.

Notice of Allowance in U.S. Appl. No. 12/951,528 mailed Aug. 26, 2013, 33 pages.

Notice of Allowance and Fee(s) Due in U.S. Appl. No. 12/951,747, mailed Dec. 11, 2013, 35 pages.

Non Final Office Action in U.S. Appl. No. 13/932,866, mailed Dec. 20, 2013, 19 pages.

Non-Final Office Action dated Sep. 25, 2012 in U.S. Appl. No. 12/951,528, 15 pages.

(56) References Cited

OTHER PUBLICATIONS

Chinese Office Action dated Sep. 16, 2014 in Chinese Application No. 201110373395.6, 7 pages.
Non-Final Office Action dated Nov. 2, 2012 in U.S. Appl. No. 12/951,816, 8 pages.
Non-Final Office Action dated Apr. 11, 2014 in U.S. Appl. No. 12/951,815, 9 pages.
Notice of Allowance dated Apr. 11, 2014 in U.S. Appl. No. 13/932,866, 7 pages.
Chinese Office Action dated Aug. 11, 2014 in Chinese Application No. 201110373345.8, 6 pages.
Final Office Action dated Nov. 6, 2014 in U.S. Appl. No. 12/951,815, 13 pages.
Non-Final Office Action dated Mar. 25, 2015 in U.S. Appl. No. 13/045,278, 33 pages.
Non-Final Office Action dated Jun. 17, 2015 in U.S. Appl. No. 12/951,815, 12 pages.
Notice of Allowance dated Jul. 10, 2015 in U.S. Appl. No. 13/072,419, 16 pages.
Notice of Allowance dated Nov. 25, 2015 in U.S. Appl. No. 13/045,278, 5 pages.
Notice of Allowance dated Apr. 4, 1206 in U.S. Appl. No. 12/951,815, 10 pages.
Chinese Office Action dated May 5, 2016 with Search Report dated Apr. 18, 2016 in Chinese Patent Application No. 201210060934.5, 11 pages.
Chinese Office Action dated Jun. 8, 2016 with Search Report dated May 27, 2016 in Chinese Patent Application No. 201210079487.8, 13 pages.
Zhaohui Zheng, et al. Query-Level Learning to Rank Using Isotonic Regression—Pub. Date: Sep. 26, 2008 http://ieeexplore.ieee.org/stamp/stamp.jsp?arnumber=04797684.
Gui-Rong Zue Ke Zhou, et al., Learning to Rank with Ties—Pub. Date: Jul. 24, 2008 http://sites.google.com/site/archkzhou/home/p275-zhou.pdf.
Tao Qin, et al., Learning to Rank Relational Objects and Its Application to Web Search—Pub. Date: Apr. 25, 2008 http://www2008.org/papers/pdf/p407-qinA.pdf.
Andrew Cencini, SQL Server 2005 Full-Text Search: Internals and Enhancements—Pub. Date: Dec. 2003 http://msdn.microsoft.com/en-us/library/ms345119%28SQL.90%29.aspx.
Mark Bennett, Do You Need Synthetic Tokens? (part 2)—Published Date: Dec. 2009 http://www.ideaeng.com/tabId/98/itemId/209/Do-You-Need-Synthetic-Tokens-part-2.aspx.
Steven Burrows, et al., Efficient and Effective Plagiarism Detection for Large Code Repositories—Pub. Date: 2004 http://www.cs.berkeley.edu/~benr/publications/auscc04/papers/burrows-auscc04.pdf.
Andrew Kane, Simulation of Distributed Search Engines: Comparing Term, Document and Hybrid Distribution—Published Date: Feb. 18, 2009 http://www.cs.uwaterloo.ca/research/tr/2009/CS-2009-10.pdf.
Lei Zheng, et al., Document-Oriented Pruning of the Inverted Index in Information Retrieval Systems—Pub. Date: 2009 http://ieeexplore.ieee.org/stamp/stamp.jsp?tp=&arnumber=5136730.
Ahmad Abusukhon, et al., Comparison Between Document-based, Term-based and Hybrid Partitioning—Pub. Date: Aug. 4, 2008 http://ieeexplore.ieee.org/stamp/stamp.jsp?arnumber=04664324.
Chunqiang Tang, et al., Hybrid Global-Local Indexing for Efficient Peer-To-Peer Information Retrieval—Pub. Date: 2004 http://citeseerx.ist.psu.edu/viewdoc/download?doi=10.1.1.81.5268&rep=rep1&type=ps.
Kuansan Wang, et al., Multi-Style Language Model for Web Scale Information Retrieval—Pub. Date: Jul. 23, 2010 http://research.microsoft.com/en-us/um/people/jfgao/paper/fp580-wang.pdf.
David Carmel, et al., Juru at TREC 10—Experiments with Index Pruning RD—Retrieved Date: Aug. 12, 2010 http://citeseerxist.psu.edu/viewdoc/download?doi=10.1.1.81.6833&rep=rep1&type=pdf.
Using and storing the index—Retrieved Date: Aug. 13, 2010 http://www.cs.princeton.edu/courses/archive/spring10/cos435/Notes/indexing_topost.pdf.
Matthias Bender, et al., Design Alternatives for Large-Scale Web Search: Alexander was Great, Aeneas a Pioneer, and Anakin has the Force—Retrieved Date: Aug. 16, 2010 http://qid3.mmci.uni-saarland.de/publications/lsds2007.pdf.
Parallel Information Retrieval—Retrieved Date: Aug. 16, 2010 http://www.ir.uwaterloo.ca/book/14-parallel-information-retrieval.pdf.
Diego Puppin, et al., Query-Driven Document Partitioning and Collection Selection—Retrieved Date: Aug. 16, 2010 http://citeseerxist.psu.edu/viewdoc/download?doi=10.1.1.101.6421&rep=rep1&type=pdf.
Ohm Sornil, et al., Hybrid Partitioned Inverted Indices for Large-Scale Digital Libraries—Retrieved Date: Aug. 16, 2010 http://ncsi-net.ncsi.iisc.ernet.in/gsdl/collect/icco/index/assoc/HASH472d.dir/doc.pdf.
Non-Final Office Action in U.S. Appl. No. 13/072,419 mailed Jan. 15, 2013, 69 pages.
Notice of Allowance in U.S. Appl. No. 12/951,659, mailed Mar. 8, 2013, 51 pages.
Zhuang, et al., Re-Ranking Search Results Using Query Logs, 2006, ACM, pp. 1-2.
Final Office Action in U.S. Appl. No. 12/951,815, mailed Apr. 10, 2013, 14 pages.
Final Office Action in U.S. Appl. No. 12/951,747, mailed Apr. 9, 2013, 16 pages.
Final Office Action in U.S. Appl. No. 12/951,528, mailed Apr. 8, 2013, 22 pages.
Non-Final Office Action dated Aug. 11, 2016 in U.S. Appl. No. 14/325,871, 11 pages.

* cited by examiner

TIERING OF POSTING LISTS IN SEARCH ENGINE INDEX

CROSS-REFERENCE TO RELATED APPLICATIONS

This application is related by subject matter to the inventions disclosed in the following commonly assigned applications filed on even date herewith: U.S. application Ser. No. 12/951,528, entitled "MATCHING FUNNEL FOR LARGE DOCUMENT INDEX"; U.S. application Ser. No. 12/951,659, entitled "DECOMPOSABLE RANKING FOR EFFICIENT PRECOMPUTING"; U.S. application Ser. No. 12/951,747, entitled "EFFICIENT FORWARD RANKING IN A SEARCH ENGINE"; and U.S. application Ser. No. 12/951,815, entitled "HYBRID DISTRIBUTION MODEL FOR SEARCH ENGINE INDEXES". Each of the aforementioned applications is herein incorporated by reference in its entirety.

BACKGROUND

The amount of information and content available on the Internet continues to grow rapidly. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Search engines operate by crawling documents and indexing information regarding the documents in a search index. When a search query is received, the search engine employs the search index to identify documents relevant to the search query. Use of a search index in this manner allows for fast retrieval of information for queries. Without a search index, a search engine would need to search the corpus of documents to find relevant results, which would take an unacceptable amount of time.

As the Internet continues to grow, search engines continue to index larger numbers of documents. Given a large search index, some queries may take an amount of time to run that is unacceptable to users. As a result, search engines often take shortcuts when querying a search index in order to return search results back to users in a timely manner. Often, users' expectations are to receive search results within a few hundred milliseconds. To meet this constraint, some search engines may only partially evaluate search queries, which may adversely impact the quality of the search results.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a search index having tiered postings lists. Each posting list in the search index corresponds with a particular atom and includes a list of documents containing that atom. A tiered posting list is one in which the posting list is divided into tiers with the tiers being ordered by rank while each tier is internally ordered by document. When a search query is received, the tiered posting lists allow the search query to be evaluated in a manner that allows for a number of efficiencies and precise stopping. In one embodiment, tiers of posting lists may be sequentially merged while evaluating between levels of tiers whether additional processing is required based on the results of tiers already merged.

BRIEF DESCRIPTION OF THE DRAWINGS

The present invention is described in detail below with reference to the attached drawing figures, wherein.

DETAILED DESCRIPTION

Figure 1:
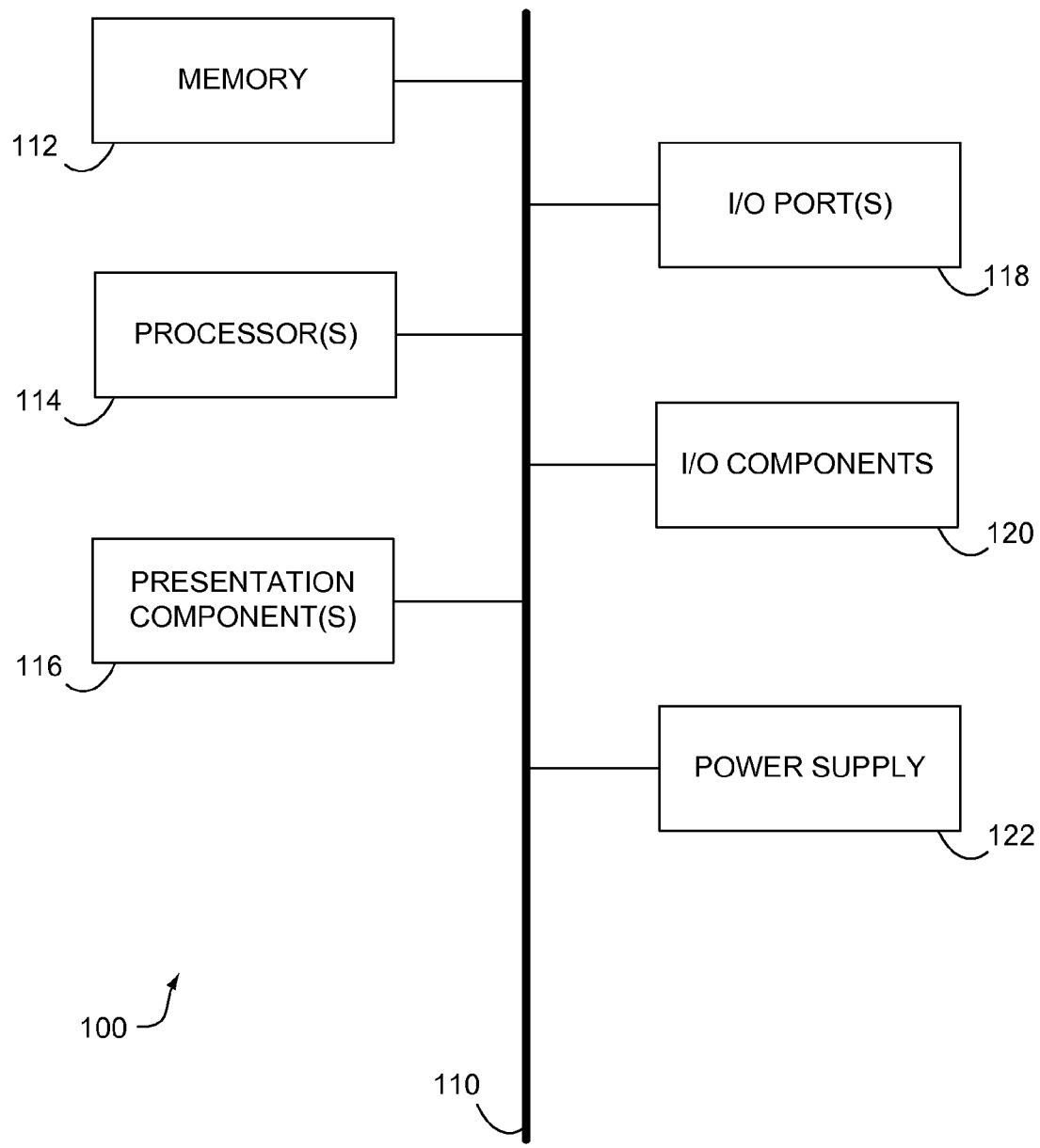
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a search index with tiered posting lists. The search index employed by embodiments of the present invention indexes higher order primitives or "atoms" from documents, as opposed to simply indexing single terms. As used herein, an "atom" may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describes each of the above-described varieties.

Each posting list corresponds with an atom identified in the corpus of documents indexed. The posting list includes entries each identifying a document and a rank that comprises a score representing the importance of the atom in the context of the document. At least some of the posting lists in the search index are divided into multiple tiers. The tiers of a given posting list are ordered by rank. For instance, a first tier may have a number of documents with ranks above a particular value, a second tier may have a number of documents with ranks within a range lower than that particular value, etc. The tiers may be based on non-overlapping ranges of rank. Additionally, the tiers are each internally ordered by document. That is, there is a document sequence that has no necessary relation to rank. For instance, a numerical identifier may be associated with each document, and the document sequence may be the sequence of documents in an ascending numerical identifier order. As such, the tiers are each internally ordered in accordance with the same document sequence. As will be described in further detail herein, this facilitates performing matching between tiers.

In some embodiments, the index may be built using tiering in which the index does not include the rank or abbreviates the rank compared to the values which were the original ranks used to form the order. In other words, the ranks may be removed or abbreviated when a list is tiered, or the tiering may be based upon a more accurate rank originally known but not kept in the actual index as it is stored and used.

Employing a search index with tiered posting lists provides a number of efficiencies when performing searches. For instance, when a search query is received from which multiple atoms are identified, the tiers of posting lists may be sequentially merged while evaluating whether additional processing is required based on the combined rank of matching documents found in evaluated tiers as compared to possible combined rank of documents that could be retrieved in the lower tiers. This allows for precise stopping. The stopping is precise in contrast to just stopping early as nothing is lost because all remaining combinations are calculated to be lower ranked.

In some embodiments, tiered posting lists may be employed to perform a "soft-AND" operation. For instance, if atom A is reasonably common, the atom has less significance and a long posting list. As such, the process may choose not to read atom A's lower ranked tiers if it is determined that those lower level ranked tiers would be much less significant than the other atoms that the process is trying to match with atom A. Accordingly, the process may soft-AND atom A when far enough into the operation that atom A's lower tiers would be evaluated but other higher-ranked atoms are dominating the matching process. A nominal value may be applied to the soft-AND atom such that the overall ranking score for documents found in the posting lists for the other atoms are computed using the nominal value. In still further embodiments of the present invention, tiered posting lists allow a first tier of a posting list to act as a "cut-index" in the case of single atom queries.

Accordingly, in one aspect, an embodiment of the present invention is directed to one or more computer storage media storing a data structure for a search index. The data structure includes a plurality of posting lists, each posting list being associated with a different atom and including a plurality of postings, each posting within each posting list corresponding with a given document and identifying the given document and a rank for the given document, wherein each posting list is divided into a plurality of tiers, the tiers within a posting list being ordered by rank while the postings within each tier being internally ordered by document sequence.

In another embodiment, an aspect of the present invention is directed to one or more computer storage media storing computer useable instructions that, when used by a computing device, cause the computing device to perform a method. The method includes accessing document content for a plurality of documents. The method also includes identifying atoms within the document content of each document. The method further includes determining ranks for atoms found in the document content of each document, wherein the rank for a given atom found in a given document comprises a score representing the importance of the given atom within the context of the given document. The method still further includes generating a search index comprising a plurality of posting lists, each posting list corresponding with an atom identified within the document content of the plurality of documents, wherein each posting within a given posting list corresponding with a particular atom identifies a document containing the atom and a rank for the document and the atom, wherein each posting list is divided into a plurality of tiers ordered based on rank, and wherein postings within each tier are internally ordered based on document.

A further embodiment is directed to one or more computer storage media storing computer useable instructions that, when used by a computing device, cause the computing device to perform a method. The method includes receiving a search query comprising one or more terms. The method also includes analyzing the search query to identify one or more atoms from the one or more terms. The method further includes querying a search index using the one or more atoms identified from the search query, wherein the search index comprises a plurality of postings lists, each posting list corresponding with an atom and including a plurality of postings, wherein each posting within a given posting list corresponding with an atom identifies a document containing the atom and a rank representing a significance of the atom for the document, wherein each posting list is divided into a plurality of tiers ordered based on rank, and wherein postings within each tier are internally ordered based on document. The method also includes identifying a plurality of documents from querying the search index. The method still further includes providing a plurality of search results for presentation to an end user based on the plurality of documents identified by querying the search index.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
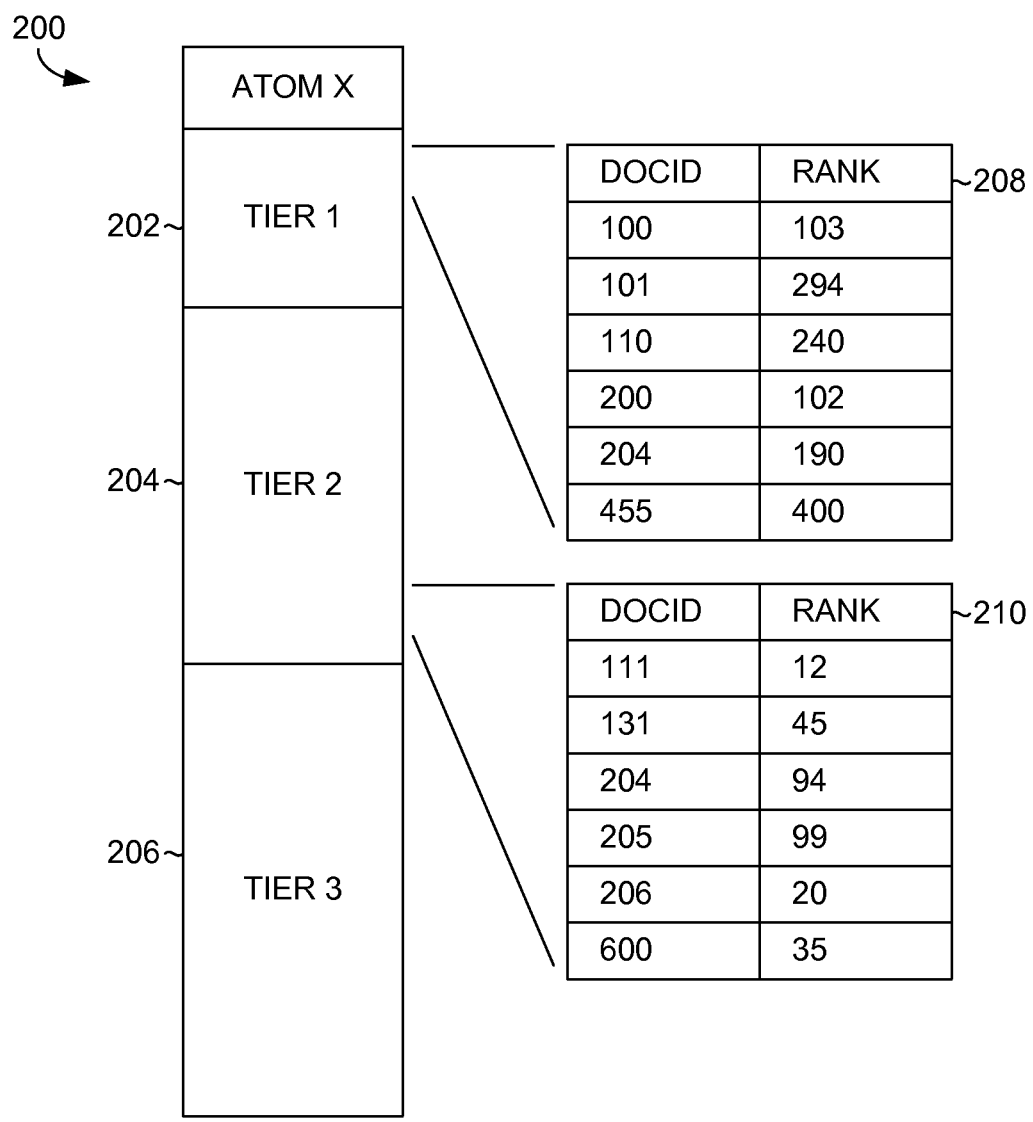
FIG. 2 is a diagram illustrating a tiered posting list in accordance with an embodiment of the present invention.

Turning now to FIG. 2, a diagram is provided that illustrates a tiered posting list 200 in accordance with an embodiment of the present invention. The posting list 200 shown in FIG. 2 is for a given atom "X." The posting list 200 generally includes a list of postings. Each posting identifies a document that includes atom X and an indication of the rank for that document. Each document may be identified within a posting using a document identifier. In the embodiment shown in FIG. 2, a numerical identifier is employed to identify each document.

The rank assigned to a given document is a score that reflects the importance of atom X within the context of that document. Any number of algorithms may be employed to assign a rank to a given document for a given atom. By way of example only, a document's rank may be a score based on term-frequency inverse-document frequency (TF/IDF) functions as known in the art. For instance, the document rank may be a score generated using the BM25F ranking function. In the exemplary embodiment, a higher ranking reflects a greater importance (although the inverse may be employed in some embodiments). As such, documents with higher ranks correspond with documents that are considered to have higher relevance for atom X. In some embodiments, a rank for a given posting may take into account the overall importance of the atom.

As shown in FIG. 2, the posting list 200 for atom X is divided into three tiers, tier 1 202, tier 2 204, and tier 3 206. The tiers are divided based on document ranks. In particular, tier 1 202 includes documents with the highest ranks for atom X, tier 2 204 includes documents with the next highest ranks for atom X, and tier 3 206 includes documents with the next highest ranks for atom X. Although the tiers are ordered based on document rank, the postings within each tier are internally ordered based on document ID as opposed to rank. This is illustrated in portion 208 of tier 1 and portion 210 of tier 2 shown in FIG. 2. In particular, the postings are listed in order of document identifiers, not rank.

When constructing a posting list for a search index, the number of tiers to include in the posting list and the number of documents to include within each tier is configurable and may be determined in a number of different manners within the scope of embodiments of the present invention. Additionally, the number of tiers and number of documents per tier may vary from posting list to posting list within the same search index. In some embodiments, the number of tiers to include in a posting list and the number of documents to include in each tier may be based on factors such as the number of documents indexed in the search index, the number of documents containing the atom, and the statistics surrounding the likelihood of finding matching documents from the posting list. These factors may also be employed for pruning when constructing posting lists. In particular, all documents containing a particular atom may not be indexed in the posting list for the atom. Instead, documents having the lowest rank for the atom may be pruned when the posting list is constructed such that they are not included in the posting list.

In some embodiments, the tiers of a posting list may be stored on different types of storage devices. For instance, tiers having higher ranked documents that are accessed more frequently could be stored on faster types of storage devices, such as in RAM or flash-based solid state devices. Lower tiers having lower ranked documents that are accessed less frequently could be stored on slower types of storage devices, such as hard disk drives.

Employing an index with posting lists having tiers ordered by rank while internally ordered within the tiers by document provides a number of efficiencies to returning results to search queries. For instance, because postings are internally ordered by document, rapid merge joins may be performed between two or more posting lists to identify matching documents. In principle, two or more posting lists may be merged as inner products of tiers. Additionally, by employing tiers and having known ranking thresholds between the tiers, a precise stop can be determined during the process of matching documents. For instance, the process may proceed by iteratively merging postings lists at a given level of tiers and determining whether the next level of tiers needs to be employed by evaluating whether a sufficient number of documents have been identified with a combined rank that exceeds the highest combined rank that could be achieved using lower level tiers.

Figure 3:
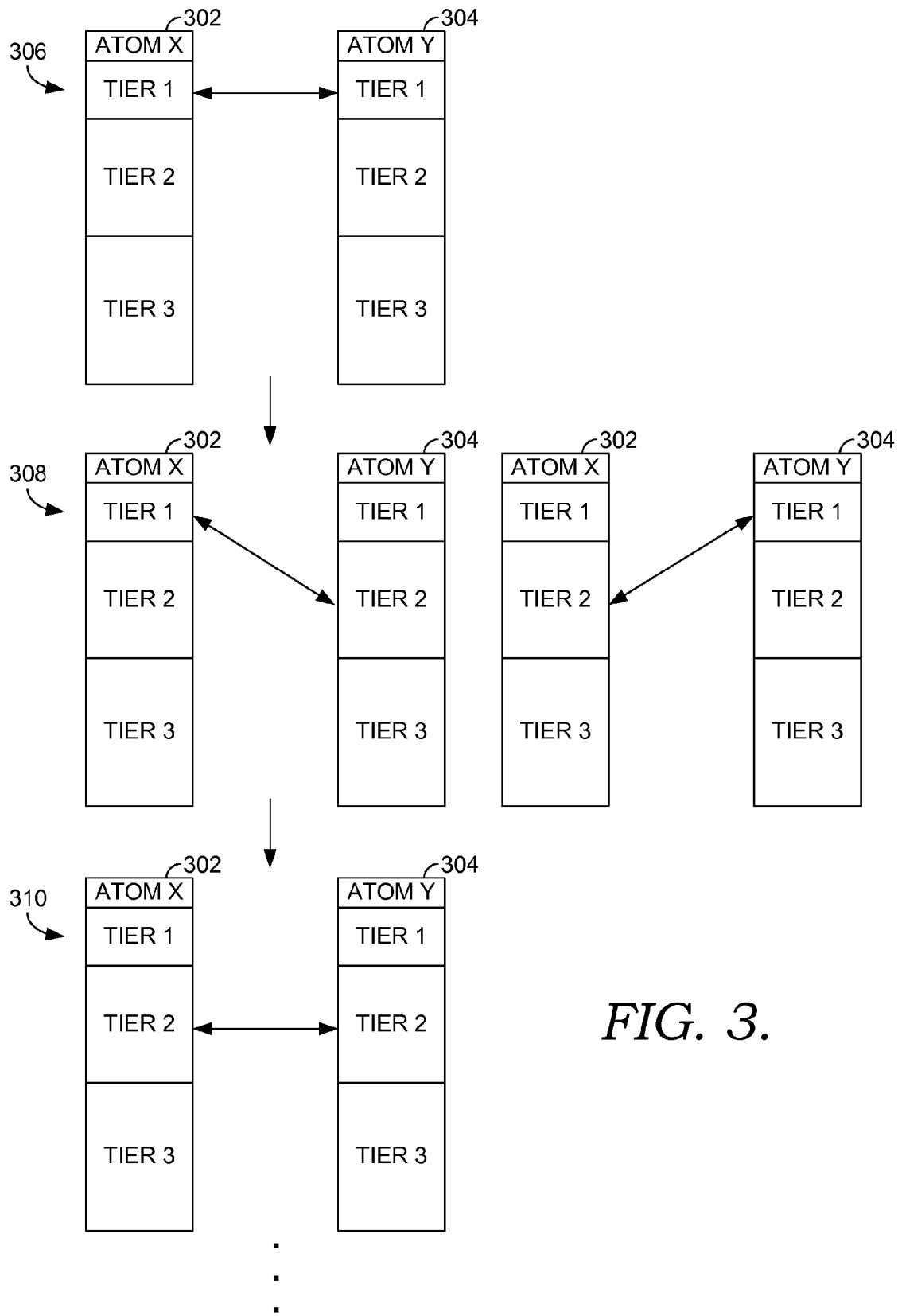
FIG. 3 is a diagram illustrating merging tiers from two posting lists in accordance with an embodiment of the present invention.

By way of illustration, FIG. 3 provides a diagram that illustrates analysis of two posting lists in response to a search query. Suppose, for instance, that a search query is received that contains two atoms: atom X and atom Y. To identify search results for the query, a posting list for atom X 302 and a posting list for atom Y 304 are accessed. Each of the posting lists 302 and 304 in the present example are broken into three tiers: a first tier, second tier, and a third tier. Initially, the first tier from the atom X posting list 302 and the first tier from the atom Y posting list 304 are merged to generate combined ranks for documents within the first tiers, as shown at 306. An analysis may then be performed to determine if the process may stop. For instance, the search engine may be seeking to return the top N search results identified from the search index. If the top N documents from merging the first tiers have a lowest rank that is greater than the highest rank that could be achieved by using the next level of tiers (i.e., the second tiers from the posting lists 302 and 304), it is mathematically impossible for any remaining coincidences to have a ranking higher than the results already found. Therefore, the process may stop as the top N documents have been retrieved already.

However, if it is determined that the process should continue as results from lower tiers may outrank results from the first tiers, additional tiers may be merged. For instance, the first tier from the atom X posting list 302 may be merged with the second tier from the atom Y posting list 304, and the second tier from the atom X posting list 302 may be merged with the first tier from the atom Y posting list 304, as shown at 308. Again, the results are analyzed against the known ranking thresholds for the remaining tiers to determine if the process may be stopped. If the process continues, the second tiers of the posting lists 302 and 304 may next be merged, as shown at 310, and an evaluation performed to determine if the process may stop. The merging and stop evaluating process may continue until a stop is identified or until all tiers have been evaluated.

Tiered posting lists also allow the search engine to employ a "soft-AND" operator in some cases of matching documents from posting lists. In particular, when merging tiers from two posting lists, they may be some instances in which there are very few or no coincidences for the two atoms. This may be a result of one of the atoms being very rare. However, rarity indicates significance and that logically means that the ranks of the postings for the very rare atom likely hugely outrank anything in the posting list for the other atom. In that case, the system may ignore the remaining postings for the more common atom and just replace them by a substitute value (a function of the highest value the posting could have had and yet been discarded) and do a "soft-AND" to move the best ranked documents on the posting list of the very rare atom into the retained candidate list even when the system doesn't know if those documents would have had an intersection with remaining postings in the posting list of the more common atom.

Having tiered posting lists in a search index also allows a first tier of a posting list to act as a "cut-index" when a single atom query is received. When a search query is received from which only a single atom is identified, the posting list for that atom may be identified. Since matching with another posting list is not required, only the first tier with the highest ranked documents needs to be retrieved. Search results may then be generated based on the documents within the first tier.

Figure 4:
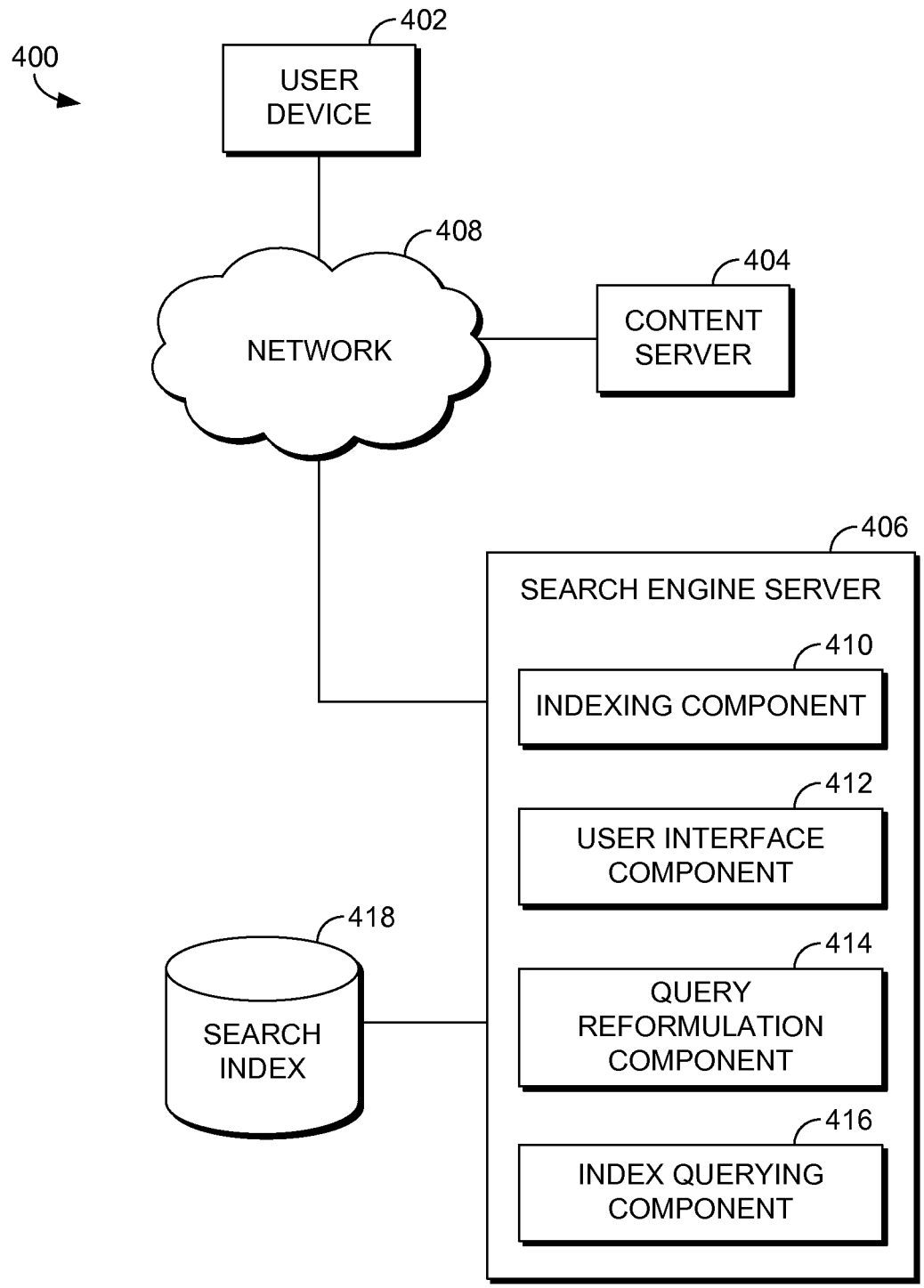
FIG. 4 is a block diagram of an exemplary system in which embodiments of the present invention may be employed.

Referring now to FIG. 4, a block diagram is provided illustrating an exemplary system 400 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 400 may include a user device 402, content server 404, and search engine server 406. Each of the components shown in FIG. 4 may be any type of computing device, such as computing device 100 described with reference to FIG. 1, for example. The components may communicate with each other via a network 408, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 400 within the scope of the present invention. Each may comprise a single device or multiple devices cooperating in a distributed environment. For instance, the search engine server 406 may comprise multiple devices arranged in a distributed environment that collectively provide the functionality of the search engine server 406 described herein. Additionally, other components not shown may also be included within the system 400.

The search engine server 406 generally operates to receive search queries from user devices, such as the user device 402, and to provide search results in response to the search queries. The search engine server 406 includes, among other things, an indexing component 410, a user interface component 412, a query reformulation component 414, and an index querying component 416.

The indexing component 410 operates to index data regarding documents maintained by content servers, such as the content server 404. For instance, a crawling component (not shown) may be employed to crawl content servers and access information regarding documents maintained by the content servers. The indexing component 410 then indexes data regarding the crawled documents in the search index 418. In embodiments, the indexing component 410 indexes atoms found in documents and the documents' context, references, and other context. For instance, atoms can be found in not only the document content but can also be found outside of the document. For instance, atoms can originate in how the document is summarized in other places where links are found, in searches where the document was known to be used, in URLs, in titles, as well as other sources. The indexing component 410 also indexes scoring information for documents for which each atom is found indicating the importance of the atom in the context of the document. Any number of algorithms may be employed to calculate a rank for an atom found in a document. By way of example only, the rank may be a score based on term-frequency inverse-document frequency (TF/IDF) functions as known in the art. For instance, the BM25F ranking function may be employed. The scores generated for document/atom pairs are stored as ranks in the search index 418.

In embodiments, the indexing component 410 analyzes each document to identify terms, n-grams, and n-tuples and to determine which of these atoms should be indexed for the document. During processing of documents to be indexed, statistics about query distribution, term distribution, and/or the scoring function used to calculate the score/significance for the document as a whole may be used to statistically select the best set of atoms to represent the document. These selected atoms are indexed in the search index 418 with the computed ranks.

When generating the search index 418, the indexing component 410 creates postings lists having tiers. As discussed above with reference to FIG. 2, a posting list may have multiple tiers with each tier having a number of documents. The tiers are ordered by ranked (i.e., the first tier having documents with ranks above a first threshold, the second tier having documents with ranks within a given range below the first threshold, etc.). Additionally, the tiers are internally ordered by document sequence. Not all posting lists are necessarily tiered in the search index 418. For instance, a posting list for an atom may be short enough such that only a single tier is used. The number of tiers to use for any given atom and the number of documents to include in each tier may be configurable and based on factors such as the number of documents indexed in the search index 418, the number of documents containing the atom, and the statistics surrounding the likelihood of finding matching documents from the posting list. Furthermore, when generating the search index 418, the indexing component 410 may decide to reduce the number of atoms indexed for each document and may also limit the number of documents indexed for each atom.

The user interface component 412 provides an interface to user devices, such as the user device 402, that allows users to submit search queries to the search engine server 406 and to receive search results from the search engine server 406. The user device 402 may be any type of computing device employed by a user to submit search queries and receive search results. By way of example only and not limitation, the user device 402 may be a desktop computer, a laptop computer, a tablet computer, a mobile device, or other type of computing device. The user device 402 may include an application that allows a user to enter a search query and submit the search query to the search engine server 406 to retrieve search results. For instance, the user device 402 may include a web browser that includes a search input box or allows a user to access a search page to submit a search query. Other mechanisms for submitting search queries to search engines are contemplated to be within the scope of embodiments of the present invention.

When a search query is received via the user interface component 412, the query reformulation component 414 operates to reformulate the query. The query is reformulated from its free text form into a format that facilitates querying the search index 418 based on how data is indexed in the search index 418. In embodiments, the terms of the search query are analyzed to identify atoms that may be used to query the search index 418. The atoms may be identified using similar techniques that were used to identify atoms in documents when indexing the documents in the search index 418. For instance, atoms may be identified based on the statistics of terms and query distribution information. The query reformulation component 414 may provide a set of conjunction of atoms and cascading variants of these atoms. The atoms may be from terms literal to the query and terms inferred from various paraphrasings or alterations of the query. For instance, this may include generating terms such as synonyms, plurals, or corrections which are not actually within the query, but which the query is expanded to encompass.

The index querying component 416 operates to query the search index 418 using the atoms identified by the query reformulation component. Conceptually, the index querying component 418 may merge posting lists for the atoms as inner products of the tiers. This may be an iterative process in which an evaluation is performed before moving on to a next of level tiers to determine if the process may be stopped. In cases of single atom queries, the index querying component 416 may simply retrieve the top tier of the posting list for the single atom. Further, in cases in which there are multiple atoms, one of which has a very long posting list (e.g., when compared with the other atoms), the index querying component 416 may employ a "soft-AND" operator to allow the lower tier of the longest atoms to be replaced by an assumption of presence, allowing more rare and significant atoms of the query to dominate the matching calculation.

Figure 5:
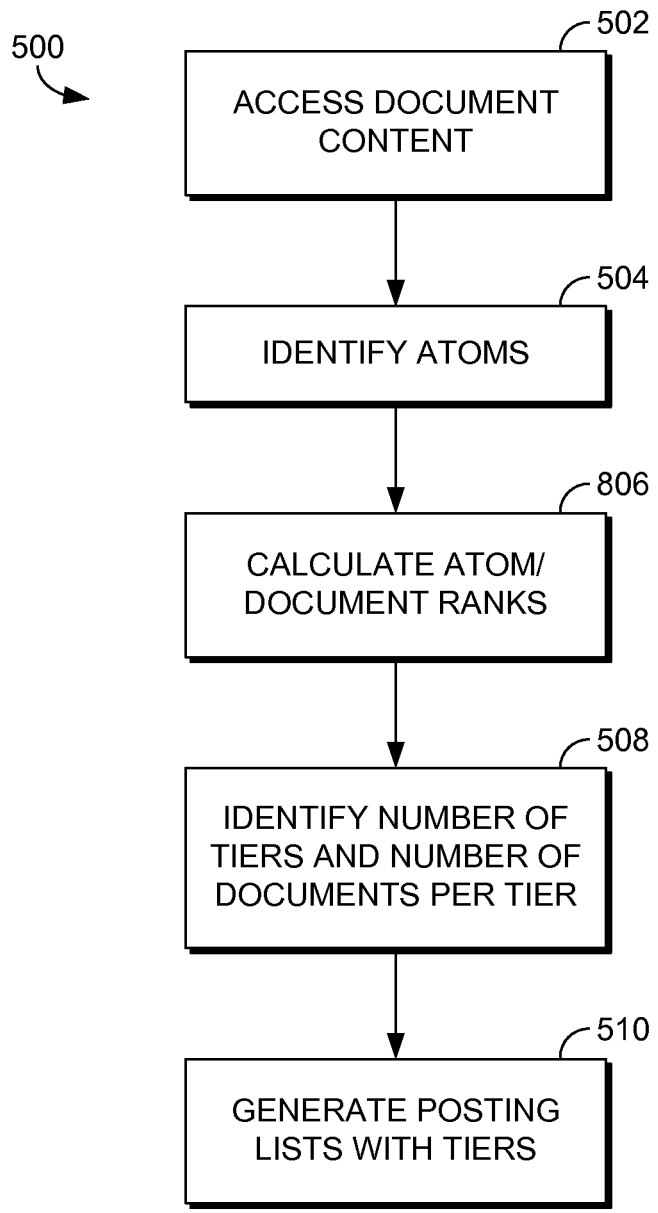
FIG. 5 is a flow diagram showing a method for creating a search index having tiered posting lists in accordance with an embodiment of the present invention.

Turning next to FIG. 5, a flow diagram is provided that illustrates a method 500 for generating an index with tiered posting lists in accordance with an embodiment of the present invention. As shown at block 502, document content is accessed from documents to be indexed. For instance, document content may be accessed by crawling documents. The document content for a document may include a stream of terms found in the document. Atoms are identified from the document content, as shown at block 504. As noted above, the process may include analyzing the text of the document to identify terms, n-grams, and n-tuples and to determine which of these atoms should be indexed for the document. Statistics about query distribution, term distribution, and/or the simplified scoring function to be used during the funnel process may be used to statistically select the best set of atoms to represent the document.

Ranks are calculated for atoms found in a given document, as shown at block 506. A rank for a given atom found in a document comprises a score representing the importance of the atom within the context of the document. A number of different algorithms may be employed to determine the rank assigned to a document and atom in accordance within the scope of embodiments of the present invention. By way of example only, the score may be based on term-frequency inverse-document frequency (TF/IDF) functions as known in the art. For instance, the BM25F ranking function may be employed. Pruning may be done to reduce the number of atoms that are indexed for a given document. For instance, in some embodiments, only a predetermined number of atoms may be indexed for a given document. In other embodiments, only atoms in which the rank determined for the document is above a certain threshold may be indexed for that document.

The number of tiers for a given posting list and the number of documents per tier are identified at block 508. As noted above, the number of tiers to include in a posting list and the number of documents to include within each tier is configurable. In embodiments, the number of tiers to include in a posting list and the number of documents to include in each tier may be based on factors such as the number of documents indexed in the search index, the number of documents containing the atom, and the statistics surrounding the likelihood of finding matching documents from the posting list.

Postings lists are generated for atoms, as shown at block 510. Each posting list corresponds with a particular atom. Each posting in a posting list for a given atom identifies a document and a rank representing the importance of the atom in the context of the document. In accordance with embodiments of the present invention, posting lists are constructed with tiers, although some posting lists may only have a single tier (e.g., short posting lists). A tiered posting list includes the number of tiers determined for the posting list, with each tier containing the determined number of documents. The tiers are ordered against one another by rank while internally being ordered by document. When constructing a posting list for a given atom, documents containing the atom may be pruned. For instance, documents having the lowest rank for the atom may not be included in the posting list. The determination of how many documents to include in the posting list and how many documents to prune may be based on factors similar to those used to determine how many tiers to employ and how many document to include in each tier.

Figure 6:
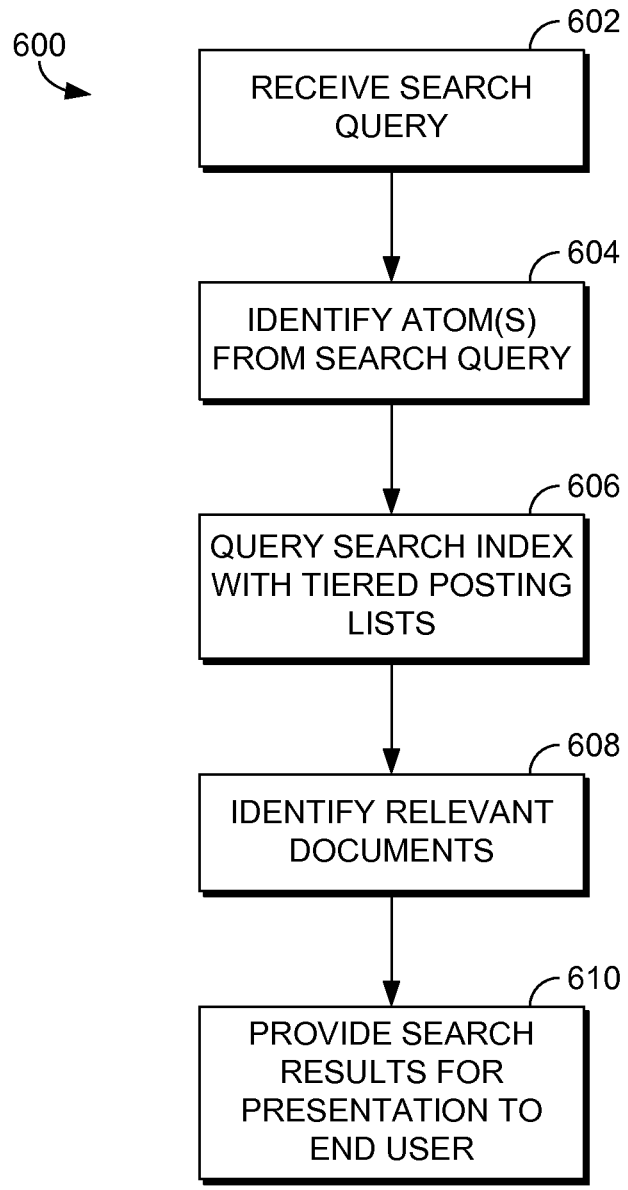
FIG. 6 is a flow diagram showing a general method for using a search index having tiered posting lists to provide search results in response to a search query in accordance with an embodiment of the present invention.

With reference now to FIG. 6, a flow diagram is provided that illustrates a general method 600 for using a search index with tiered posting lists to provide search results in accordance with an embodiment of the present invention. As shown at block 602, a search query is received. The search query is analyzed at block 604 to identify one or more atoms. In some embodiments, this analysis may be similar to the analysis used to identify atoms in documents when indexing document data. For instance, statistics of terms and search queries may be employed to identify atoms in the search query.

A search index having tiered posting lists is queried to identify relevant documents, as shown at block 606. This may include identifying the posting list associated with each atom identified from the search query. Additionally, tiers from the posting lists are queried until a sufficient threshold is reached. This may include querying only a single tier or querying multiple tiers depending on the atoms identified from the search query and the confluence of the tiers from the posting lists. The process may be stopped when a sufficient number of documents have been identified and/or when it is determined that no other matches will have sufficient relevance.

As a result of querying the search index, a number of documents are identified as having the highest relevance to the search query, as shown at block 608. A set of search results is generated based on the identified documents and provided to the end user who submitted the original search query, as shown at block 610.

Figure 7:
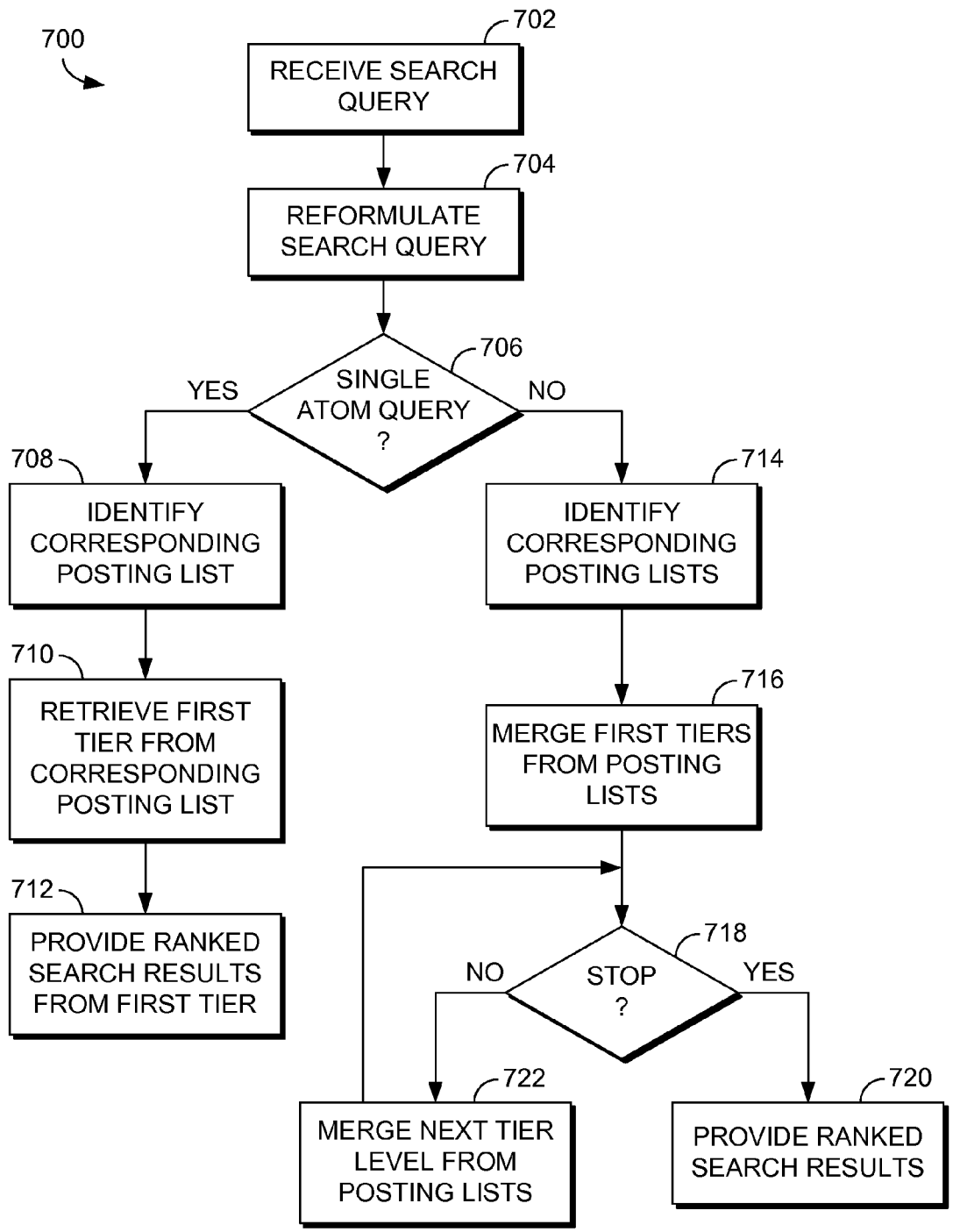
FIG. 7 is a flow diagram showing a more specific method for using a search index having tiered posting lists to provide search results in response to a search query in accordance with an embodiment of the present invention.

Turning next to FIG. 7, a flow diagram is provided that illustrates a more specific method 700 for employing a search index with tiered posting lists to provide search results to a search query in accordance with an embodiment of the present invention. As shown at block 702, a search query is received. The received search query is reformulated at block 704. In particular, the search query may include a number of terms. The terms of the search query are analyzed to identify one or more atoms that will be used to query the search index. As indicated above, this analysis may be similar to the analysis used to identify atoms in documents when indexing document data. For instance, statistics of terms and search queries may be employed to identify atoms in the search query. The reformulated query may comprise a set of conjunction of atoms and cascading variants of these.

A determination is made at block 706 regarding whether the search query comprises a single atom. If so, a "cut-index" approach as discussed above may be employed to identify search results. As shown at block 708, a posting list corresponding with the single atom from the search query is identified. The first tier from that posting list is retrieved at block 710. A set of ranked search results are then provided based on documents identified in the first tier for presentation to an end user, as shown at block 712. In some embodiments, the set of ranked search results are retrieved based simply on the rank associated with each posting in the posting list. For instance, the search engine may be configured to provide search results corresponding with the top N documents. As such, postings with the top N ranks are identified, and the search results are ordered by the ranks stored in the posting list. As another example, the search engine may be configured to provide search results for all documents above a predetermined rank threshold. If so, all postings having a rank above the threshold are identified, and the search results are ordered by the ranks stored in the posting list. In some embodiments, the search engine may employ a staged process to select search results for a search query, such as the staged approach described in U.S. patent application Ser. No. 12/951,528, entitled "MATCHING FUNNEL FOR LARGE DOCUMENT INDEX." In such embodiments, a number of documents are selected from the first tier of the posting list based on the rank of the documents and used as candidates for further processing and selection of the set of ranked search results. For instance, in one embodiment, a preliminary score may be generated for each document in the first tier using a simplified scoring function. Candidate documents are then selected based on the preliminary scores. The candidate documents are processed using a final ranking algorithm to determine a set of ranked documents from which the set of search results is generated.

Returning to block 706, if two or more atoms are identified from the search query, posting lists corresponding with those atoms are identified at block 714. The first tiers from the posting lists are merged at block 716. This provides a combined rank for each document within the first tiers based on the individual rank of each document within each posting list. A determination is made at block 718 regarding whether the process of merging tiers may be stopped at this point and search results provided from this merge. The determination may be based on the combined rankings from merging the first tiers and the possible combined ranks that may be obtained from using subsequent tiers. In particular, if the highest combined rank that could be returned for a document using lower tiers is less than the lowest combined rank for a document from the first tiers, it is mathematically impossible for any remaining coincidences from lower tiers to provide a better result than found from the first tiers. If so, the process of merging tiers from posting lists may be stopped, and a set of ranked search results may be returned from the first tiers for presentation to an end user, as shown at block 720. In some embodiments, it may be determined to stop by identifying at least one of the atoms as having a very long posting list. In that case, a "soft-AND" may be applied to such long atoms which are in the presence of dominant, rarer atoms or intersections. This allows the lower tier of the longest atoms to be replaced by an assumption of presence, allowing more rare and significant atoms of the query to dominate the matching calculation.

As discussed above for block 712, in some embodiments, the set of ranked search results provided at block 720 may be determined based on the ranks stored in the posting lists. In other embodiments, a staged process may be employed and candidate documents may be selected based on the ranks stored in the posting lists and further processing may be performed to obtain the final set of ranked search results.

If it is determined at block 718 that the process of merging tiers should continue, the next level of tiers from the posting lists are merged, as shown at block 722. For instance, if two posting lists are being analyzed, the next merge includes merging the first tier from a first posting list with the second tier from the second posting list and merging the second tier from the first posting list with the first tier from the second posting list. It may also include merging the second tiers from the two posting lists. The stopping analysis at 718 is performed to determine if merging of lower tiers should be performed based on the combined ranks determined so far and/or determining to apply a "soft-AND." Additionally, the analysis at block 718 may determine that a last tier has been reached, indicating that no more merging may be performed. The process of merging lower tiers continues until a stopping determination is made at block 718 and a set of ranked search results are provided at block 720.

As can be understood, embodiments of the present invention provide a search index with tiered posting lists in which the tiers of a posting list are ordered by rank, while each tier is internally ordered by document. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer useable instructions that, when used by a computing device, cause the computing device to perform a method comprising:

receiving a search query comprising one or more terms;

analyzing the search query to identify one or more atoms from the one or more terms;

querying a search index using the one or more atoms identified from the search query, wherein the search index comprises a plurality of postings lists, each posting list corresponding with an atom and including a plurality of postings, wherein each posting within a given posting list corresponding with the atom identifies a document containing the atom and a rank representing a significance of the atom for the document, wherein at least one posting list is divided into a plurality of tiers ordered based on rank;

and wherein querying the search index comprises determining whether to perform additional processing, to identify a plurality of documents, based on comparing a combined rank of a first set of documents identified after a first tier with a calculated combined rank of the first set of documents of the first tier and one or more documents of at least a second tier;

identifying the plurality of documents from querying the search index based on the plurality of tiers ordered based on rank and the postings within each of the plurality of tiers; and providing a plurality of search results for presentation to an end user based on the plurality of documents identified by querying the search index.

2. The one or more computer storage media of claim 1, wherein querying the search index comprises:

determining that a single atom is identified from the search query;

identifying a posting list corresponding with the single atom;

retrieving postings from only the first tier of the posting list; and providing search results from the first tier of the posting list.

3. The one or more computer storage media of claim 2, wherein providing search results from the first tier of the posting list comprises providing search results corresponding with a predetermined number of postings with the highest ranks from the first tier of the posting list.

4. The one or more computer storage media of claim 2, wherein providing search results from the first tier of the posting list comprises providing search results corresponding with postings having a rank above a predetermined threshold.

5. The one or more computer storage media of claim 2, wherein providing search results from the first tier of the posting list comprises:

calculating a preliminary score using a simplified scoring function for documents within the first tier of the posting list;

selecting a subset of documents based on the preliminary scores;

calculating a final ranking score using a final ranking algorithm for each document in the subset of documents; and
providing search results based on the final ranking scores.

6. The one or more computer storage media of claim 1, wherein querying the search index comprises:
   determining that two or more atoms are identified from the search query;
   identifying posting lists corresponding with the two or more atoms; and
   merging a first level of tiers of the posting lists to obtain a set of ranked documents.

7. The one or more computer storage media of claim 6, wherein:
   if it is determined to not analyze additional levels of tiers, providing a set of search results from the set of ranked documents;
   if it is determined to analyze additional levels of tiers:
   (1) repeating: merging a combination of a next level of tiers of the posting lists to update the set of ranked documents, and evaluating whether to perform analysis of additional levels of tiers of the posting lists, until it is determined to not analyze additional levels of tiers; and
   (2) providing a set of search results from the set of ranked documents when it is determined to not analyze additional levels of tiers.

8. The one or more computer storage media of claim 7, wherein determining whether to perform analysis of additional levels of tiers comprises evaluating whether one or more posting lists are long, wherein if one or more long posting lists are identified then at least one lower level tier from the one or more long posting lists is ignored and matching between posting lists is performed by consideration of combinations of other posting lists such that the at least one lower level tier from the one or more long posting lists is assumed present and resulting matches are deemed usefully close to an intent of the search query.

9. The one or more computer storage media of claim 8, wherein the method further includes determining overall ranking values for documents by assuming presence of one or more atoms corresponding with the one or more long posting lists in documents from the other posting lists and assigning a nominal value to compute the overall ranking values for the documents.

10. The one or more computer storage media of claim 7, wherein providing search results from the set of ranked documents comprises providing search results corresponding with a predetermined number of documents with the highest ranks from the set of ranked documents.

11. The one or more computer storage media of claim 7, wherein providing search results from the set of ranked documents comprises:
    calculating a preliminary score using a simplified scoring function for documents within the set of ranked documents;
    selecting a subset of documents based on the preliminary scores;
    calculating a final ranking score using a final ranking algorithm for each document in the subset of documents; and
    providing search results based on the final ranking scores.

12. A computer-implemented method for providing search results, the method comprising:
    receiving a search query comprising one or more terms;
    analyzing the search query to identify one or more atoms from the one or more terms;
    querying a search index using the one or more atoms identified from the search query, wherein the search index comprises a plurality of postings lists, each posting list corresponding with an atom and including a plurality of postings, wherein each posting within a given posting list corresponding with an atom identifies a document containing the atom and a rank representing a significance of the atom for the document, wherein at least one posting list is divided into a plurality of tiers ordered based on rank,
    and wherein querying the search index comprises determining whether to perform additional processing, to identify a plurality of documents, based on comparing a combined rank of a first set of documents identified after a first tier with a calculated combined rank of the first set of documents of the first tier and one or more documents of at least a second tier;
    identifying a plurality of documents from querying the search index based on the plurality of tiers ordered based on rank and the postings within each of the plurality of tiers; and
    providing a plurality of search results for presentation to an end user based on the plurality of documents identified by querying the search index.

13. The computer-implemented method of claim 12, wherein a number of tiers for at least one posting list and a number of documents within each tier of the at least one posting list is determined based on the size of the document corpus used to generate the search index.

14. The computer-implemented method of claim 12, further comprising:
    determining not to analyze additional tiers, such that the first tier is the cut-index; and
    providing a set of search results from the set of ranked documents.

15. The computer-implemented method of claim 12, further comprising:
    determining to analyze additional of tiers, such that the first tier level is not the cut-index;
    update a set of ranked documents from the first tier with a set of ranked document from at least one additional tier;
    providing a set of search results from the updated set of ranked documents from the first tier and the at least one additional tier.

16. The computer-implemented method of claim 12, wherein querying the search index comprises:
    determining that two or more atoms are identified from the search query;
    identifying posting lists corresponding with the two or more atoms;
    merging a first level of tiers of the posting lists to obtain a set of ranked documents;
    determining to perform analysis of additional combinations of levels of tiers of the posting lists;
    merging a combination of a next level of tiers of the posting lists to update the set of ranked documents; and
    providing a set of search results updated from the set of ranked documents.

17. The computer-implemented method of claim 16, determining to perform analysis of additional levels of tiers is based on rankings of documents in a set of ranked documents in a first tier level and ranks of documents that can be obtained using additional levels of tiers.

18. The computer-implemented method of claim 16, wherein determining to perform analysis of additional levels of tiers comprises:

evaluating whether one or more posting lists are long, wherein if one or more long posting lists are identified then at least one lower level tier from the one or more long posting lists is ignored; and matching between posting lists is performed by consideration of combinations of other posting lists such that the at least one lower level tier from the one or more long posting lists is assumed present and resulting matches are deemed usefully close to an intent of the search query.

19. The computer-implemented method of claim 18, wherein the method further includes:

determining overall ranking values for documents by assuming presence of one or more atoms corresponding with the one or more long posting lists in documents from the other posting lists and assigning a nominal value to compute the overall ranking values for the documents.

20. The computer-implemented method of claim 16, wherein providing search results from the set of ranked documents comprises:

calculating a preliminary score using a simplified scoring function for documents within the set of ranked documents;

selecting a subset of documents based on the preliminary scores;

calculating a final ranking score using a final ranking algorithm for each document in the subset of documents; and providing search results based on the final ranking scores.

21. A system for providing search results, the system comprising:

a search engine server, having a processor and a memory configured for providing computer program instructions to the processor, the search engine server configured for:

receiving a search query comprising one or more terms;

analyzing the search query to identify one or more atoms from the one or more terms;

querying a search index using the one or more atoms identified from the search query, wherein the search index comprises a plurality of postings lists, each posting list corresponding with an atom and including a plurality of postings, wherein each posting within a given posting list corresponding with an atom identifies a document containing the atom and a rank representing a significance of the atom for the document, wherein at least one posting list is divided into a plurality of tiers ordered based on rank, and wherein querying the search index comprises determining whether to perform additional processing, to identify a plurality of documents, based on comparing a combined rank of a first set of documents identified after a first tier with a calculated combined rank of the first set of documents of the first tier and one or more documents of at least a second tier;

identifying a plurality of documents from querying the search index based on the plurality of tiers ordered based on rank and the postings within each of the plurality of tiers; and providing a plurality of search results for presentation to an end user based on the plurality of documents identified by querying the search index.

* * * * *